(12) United States Patent
Kish et al.

(10) Patent No.: US 11,363,421 B2
(45) Date of Patent: *Jun. 14, 2022

(54) INCREASING RELIABLE DATA THROUGHPUT IN A WIRELESS NETWORK

(71) Applicant: ARRIS ENTERPRISES LLC, Suwanee, GA (US)

(72) Inventors: William S. Kish, Saratoga, CA (US); John Chanak, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/786,535

(22) Filed: Oct. 17, 2017

(65) Prior Publication Data
US 2018/0124575 A1    May 3, 2018

Related U.S. Application Data

(63) Continuation of application No. 14/979,018, filed on Dec. 22, 2015, now Pat. No. 9,794,758, which is a
(Continued)

(51) Int. Cl.
*H04W 4/06* (2009.01)
*H04L 69/16* (2022.01)
(Continued)

(52) U.S. Cl.
CPC ............. *H04W 4/06* (2013.01); *H04L 1/1607* (2013.01); *H04L 69/16* (2013.01); *H04L 69/163* (2013.01);
(Continued)

(58) Field of Classification Search
CPC ....... H04W 4/06; H04W 88/06; H04W 84/12; H04W 80/06; H04W 28/06; H04W 88/04;
(Continued)

(56) References Cited

U.S. PATENT DOCUMENTS

| | | | |
|---|---|---|---|
| 7,506,036 B1 * | 3/2009 | Cook | H04L 1/1829 709/220 |
| 8,824,357 B2 * | 9/2014 | Kish | H04L 1/1607 370/315 |

(Continued)

*Primary Examiner* — Christopher P Grey
(74) *Attorney, Agent, or Firm* — Stewart A. Wiener; Myers Bigel, P.A.

(57) ABSTRACT

Systems and methods for improving data transmission rates in communication networks are disclosed. In an 802.11 wireless communication network, where a source node of the wireless network transmits TCP data to a destination node of the wireless network, the destination node does not transmit TCP acknowledgments (ACKs) for the TCP data if 802.11 ACKs indicate that the destination node received the TCP data. If a source outside the wireless network transmits TCP data to the destination node within the wireless network through an intermediate device, such as an access point, the destination node suppresses transmitting TCP ACKs. The intermediate device transmits TCP ACKs as proxy for the destination node to the source. The intermediate device also suppresses TCP ACKs where a source node within the wireless network sends the TCP data to a destination node outside of the wireless network.

20 Claims, 6 Drawing Sheets

Related U.S. Application Data continuation of application No. 11/267,477, filed on Nov. 4, 2005, now Pat. No. 9,240,868.

(60) Provisional application No. 60/625,331, filed on Nov. 5, 2004.

(51) Int. Cl.
| | | |
|---|---|---|
| *H04L 69/163* | (2022.01) | |
| *H04L 1/16* | (2006.01) | |
| *H04L 1/00* | (2006.01) | |
| *H04W 28/06* | (2009.01) | |
| *H04W 80/06* | (2009.01) | |
| *H04W 84/12* | (2009.01) | |
| *H04W 88/04* | (2009.01) | |
| *H04W 88/06* | (2009.01) | |

(52) U.S. Cl.
CPC ..... *H04L 2001/0097* (2013.01); *H04W 28/06* (2013.01); *H04W 80/06* (2013.01); *H04W 84/12* (2013.01); *H04W 88/04* (2013.01); *H04W 88/06* (2013.01)

(58) Field of Classification Search
CPC ..... H04L 69/163; H04L 69/16; H04L 1/1607; H04L 2001/0097
See application file for complete search history.

(56) References Cited

U.S. PATENT DOCUMENTS

| | | | |
|---|---|---|---|
| 9,240,868 B2* | 1/2016 | Kish | H04L 1/1607 |
| 9,794,758 B2* | 10/2017 | Kish | H04L 1/1607 |
| 2001/0047474 A1* | 11/2001 | Takagi | H04L 69/165 |
| | | | 713/151 |
| 2003/0002456 A1* | 1/2003 | Soomro | H04W 72/02 |
| | | | 370/328 |
| 2003/0128711 A1* | 7/2003 | Olariu | H04L 47/27 |
| | | | 370/401 |
| 2005/0021864 A1* | 1/2005 | Sherman | H04L 1/0083 |
| | | | 709/247 |
| 2005/0185666 A1* | 8/2005 | Raya | H04W 24/00 |
| | | | 370/461 |

\* cited by examiner

INCREASING RELIABLE DATA THROUGHPUT IN A WIRELESS NETWORK

CROSS-REFERENCE TO RELATED APPLICATIONS

The present application is a continuation and claims the benefit of U.S. patent application Ser. No. 14/979,018, filed on Dec. 22, 2015, which is a continuation of U.S. patent application Ser. No. 11/267,477, filed on Nov. 4, 2005, now U.S. Pat. No. 9,240,868, issued on Jan. 19, 2016, which claims the priority benefit of U.S. Provisional Patent Application No. 60/625,331, filed on Nov. 5, 2004, the disclosures of which are incorporated herein by reference.

BACKGROUND OF THE INVENTION

Field of the Invention

The present invention relates generally to communication networks and more particularly to systems and methods for increased data throughput over communication networks, such as wireless networks.

Description of the Related Art

A reference model can conveniently represent communication between networked devices. FIG. 1 illustrates a correlation between layers of the Open Systems Interconnection (OSI) Reference Model and the Department of Defense (DoD) Reference Model, according to the prior art. The Department of Defense Model (DoD) model and the Open Systems Interconnection (OSI) model are two standardized reference models which are well known to those skilled in the art.

These reference models represent communications as processes which occur in a hierarchy of higher and lower layer protocols. In general, each layer communicates with a higher layer protocol and a lower layer protocol. As indicated by FIG. 1, the DoD model includes four layers, a network access layer, an internet layer, a host-to-host transport layer (the transport layer), and an applications layer.

FIG. 2 illustrates physical and virtual data flow at the various layers in the DoD Reference Model during communication between two network devices, according to the prior art. Each layer in a first network device communicates with the corresponding layer in a second network device. The communication between layers is represented by dashed lines, the embedding of information in successive lower layer protocols at the first network device is represented by downward arrows between layers, and the un-packaging of information by successive higher layer protocols at the second network device is represented by upward arrows between layers.

For instance, the communication between the network devices in the transport layer (i.e., the higher layer protocol) is embedded into a communication in the internet layer (i.e., the lower layer protocol for the transport layer protocol) of each device. Physical data transfer is ultimately made at the lowest layer protocol in the hierarchy of the reference model. In the DoD network reference model, the lowest layer protocol is the network access layer.

The network access layer comprises media access control services and protocols (which attach physical source and destination addresses, e.g., Ethernet addresses, and control protocols), and the physical medium, for example, copper cables or RF specifications such as the type of modulation.

To achieve compatibility and interoperability of equipment manufactured by various different vendors, communication networks often rely on standard specifications for the network access layer. In one example, in 1997, the Institute of Electrical and Electronics Engineers (IEEE) 802 Group established the 802.11 wireless standard specifying media access (MAC) services, protocols, and an RF physical layer for wireless communication. This protocol is now in widespread use for wireless networks. For example, in an IEEE 802.11 network, an access point (e.g., a base station) communicates data with a remote receiving node (e.g., a mobile station such as a laptop computer configured with a network interface card) over a wireless link such as a radio frequency (RF) baseband wireless link.

Generally, wireless transmissions tend to be more susceptible to data losses than other forms of data transmission. Wireless transmission can be unreliable because of problems such as interference, signal attenuation, and multi-path reflections of radio signals. For example, 802.11b and 802.11g wireless local area networks (LANs) communicate by way of a 2.45 GHz frequency band which often has interfering radiation from mobile phones, microwave ovens and other 802.11 networks. To address this problem, the 802.11 specification comprises mechanisms to enable reliable communication despite the presence of interference.

In the present context, a transmission protocol is "reliable" if the protocol provides for verification that the receiving node received the data. One mechanism by which an 802.11 wireless access point provides reliable communication with an associated receiving node is with 802.11 acknowledgments (ACKs). A unicast 802.11 packet is acknowledged by the receiving node via an 802.11 ACK following a successful reception. If the access point does not detect the 802.11 ACK within a set period of time, the unicast 802.11 packet is presumed to have been lost and is therefore retransmitted by the access point. However, by implementing a reliable lower layer protocol, the transmission of 802.11 ACKs limits data transmission rates over communication networks because for successfully received unicast 802.11 packets, the 802.11 ACKs are transmitted in return.

A higher layer protocol that implements reliable transmission potentially further limits the data transmission rates when implemented on a communication network that provides a reliable lower layer protocol, such as the wireless network. For example, the transport layer of the DoD reference module typically includes reliable connection oriented protocols, such as TCP, for the exchange of data between a sender and a receiver. TCP assures reliable delivery of data services between the sender and the receiver (i.e., the source and destination) using several mechanisms. After a predefined amount of data is transmitted from the sender to the receiver, the sender must wait for a TCP acknowledgment (ACK) in the transport layer back from the receiver to confirm that the data was received. The sender is not allowed to transmit additional data until it receives this ACK, and if the sender does not receive the ACK within a predetermined time, it must retransmit the data.

FIG. 3 illustrates transmission of TCP and 802.11 acknowledgments for TCP data 350 transmitted from a source 310 to a receiving node 330, according to the prior art. The source node 310 transmits the TCP data 350 to an access point 320 over a wired network 300. The access point 320 then transmits the TCP data 350 (e.g., encapsulated in an 802.11 packet) over a wireless link 340 to the receiving node 330. If the receiving node 330 successfully receives the TCP data 350, the receiving node 330 transmits an 802.11 ACK 360 to the access point 320.

The receiving node 330 then transmits a TCP ACK 370 to the source 310 through the access point 320. The access point 320 acknowledges receipt of the TCP ACK 370 by another 802.11 ACK 380. The access point 320 finally transmits the TCP ACK 370 to the source 310.

Therefore, the TCP ACKs (e.g., the TCP ACK 370) are particularly burdensome in the 802.11 wireless LAN because multiple acknowledgments, (i.e., TCP ACKs and 802.11 ACKs) are sent to acknowledge receipt of the same communication (i.e., the TCP data 350). A wireless network, such as an IEEE 802.11 network, may provide a relatively high maximum physical data rate, for example 54 Mbps. However, because TCP packet headers and other protocol content is transmitted over the wireless link along with application layer data, in practice, the TCP data transfer rate corresponding to a 54 Mbps rate of physical transmission between physical IEEE 802.11g network devices is only about 24 Mbps. Hence, protocol overhead comprises about 50% of the application layer data rate.

Additionally, data transmission between a TCP source and a TCP destination is often unidirectional. For example, applications such as web browsers commonly receive large amounts of data from a remote website while sending little or no data back to the site. Accordingly, the TCP data transmission is often unidirectional over short intervals, and the TCP ACKs from the receiver to the sender typically carry no TCP data.

One limitation is that the protocol overhead for sending the TCP ACKs from the receiver to the sender burdens the physical communication channel when there is no actual TCP data being transferred from the receiver to the sender. Furthermore, much of this overhead is typically repeated for each TCP ACK. As a result, much of the time used to send 802.11 data packets is taken up with sending encapsulated TCP ACKs that have no accompanying TCP data and accompanying 802.11 ACKs. The multiple TCP ACKs and 802.11 ACKs increase network traffic over the communication network and limit bandwidth for the transfer of the data.

SUMMARY OF THE CLAIMED INVENTION

The present invention provides systems, devices, and methods for throughput enhancement by acknowledgment suppression. A method comprises transmitting data according to a higher layer protocol from a source to a destination through an intermediate device between the source and the destination, transmitting a first acknowledgment according to a lower layer protocol from the destination to the intermediate device, and transmitting a second acknowledgment according to the higher layer protocol to the source from the intermediate device based on the first acknowledgment. The destination may comprise a node of a wireless network. The intermediate device may comprise an access point of the wireless network.

In some embodiments, the higher layer protocol comprises TCP, a reliable connection oriented protocol, and the second acknowledgment comprises a TCP ACK. The lower layer protocol may comprise an 802.11 protocol, and the first acknowledgment comprises an 802.11 ACK.

Another method comprises transmitting data according to a higher layer protocol from a source to a destination, transmitting a first acknowledgment to the source according to a lower layer protocol from an intermediate device between the source and the destination, transmitting a second acknowledgment according to the higher layer protocol from the destination to the intermediate device, and suppressing the second acknowledgment at the intermediate device. In some embodiments, the source comprises a node of a wireless network. The intermediate device may comprise an access point of a wireless network. In some embodiments, suppressing the second acknowledgment comprises not transmitting the second acknowledgment to the source.

Still another method of the invention comprises transmitting data according to a higher layer protocol from a source to a destination through an intermediate device between the source and the destination, transmitting a first acknowledgment to the source according to a lower layer protocol from the intermediate device, and transmitting a second acknowledgment according to the lower layer protocol to the intermediate device from the destination.

A wireless local area network (LAN) device, such as an access point, is further provided. The device comprises logic configured to transmit data according to a higher layer protocol from a source to a destination, receive a first acknowledgment according to a lower layer protocol from the destination, and transmit a second acknowledgment according to the higher layer protocol to the source based on the first acknowledgment. In these embodiments, the logic may be embodied in any combination of hardware, software, and firmware elements. In some embodiments, the device is further configured to broadcast a beacon advertising a capability to generate TCP acknowledgments based on 802.11 acknowledgments.

Another wireless LAN device of the invention comprises logic configured to receive data according to a higher layer protocol from a source, transmit a first acknowledgment to the source according to a lower layer protocol, and not send a higher layer protocol acknowledgment to the source in response to receiving the data. In some embodiments, the wireless LAN device comprises a receiving node. The source in communication with the wireless LAN device may comprise an access point.

BRIEF DESCRIPTION OF THE DRAWINGS

The present invention will be described with reference to drawings that represent preferred embodiments of the invention. These embodiments are intended to illustrate without limiting the invention. Other embodiments will become apparent from the following drawings.

DETAILED DESCRIPTION

The present invention is directed to methods for improving data transmission rates in communication networks through the reduction of acknowledgment transmissions, and to systems and devices that are configured to enable the methods. Specifically in an exemplary wireless network, when a node of the wireless network is transmitting TCP data over a wireless link to a destination, TCP acknowledgments (ACKs) without data or other flag bits are not sent over the wireless link if 802.11 ACKs are sufficient to inform the node that the TCP data has been properly received by the destination. If the TCP data originates outside of the wireless network and is being sent to a destination within the wireless network, the destination suppresses the TCP ACKs and an access point of the wireless network sends the TCP ACKs to the originator. If the TCP data originates within the wireless network and is being sent out of the wireless network, the access point of the wireless network suppresses the TCP ACKs. If the TCP data is being sent between nodes in the wireless network, both the access point and the destination node suppress TCP ACKs. Accordingly, some embodiments of the present invention provide access points and wireless nodes that are configured to selectively suppress TCP ACKs when appropriate.

Figure 1:
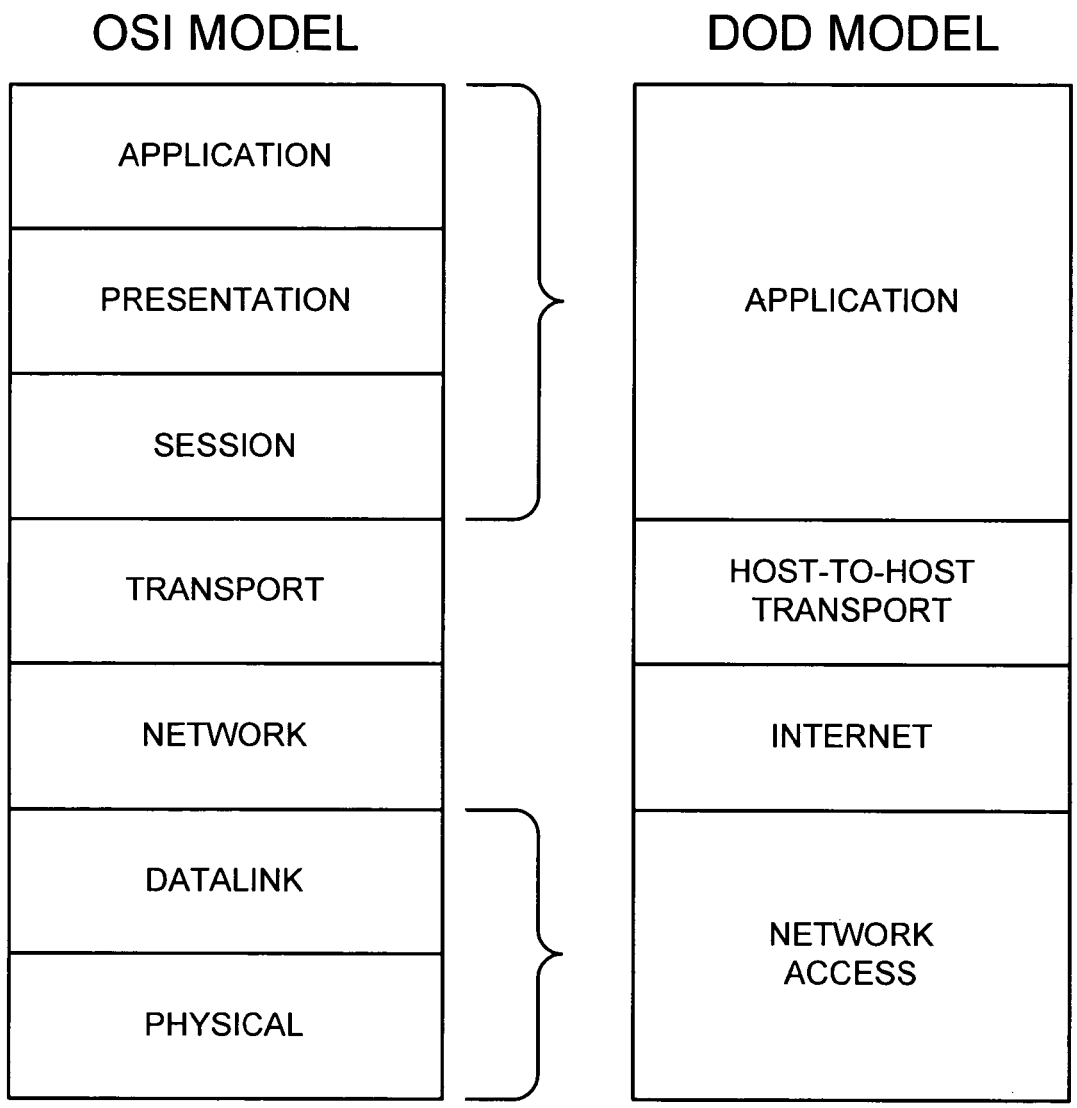
FIG. 1 illustrates a correlation between layers of the Open Systems Interconnection (OSI) Reference Model and the Department of Defense (DoD) Reference Model, according to the prior art.
Figure 2:
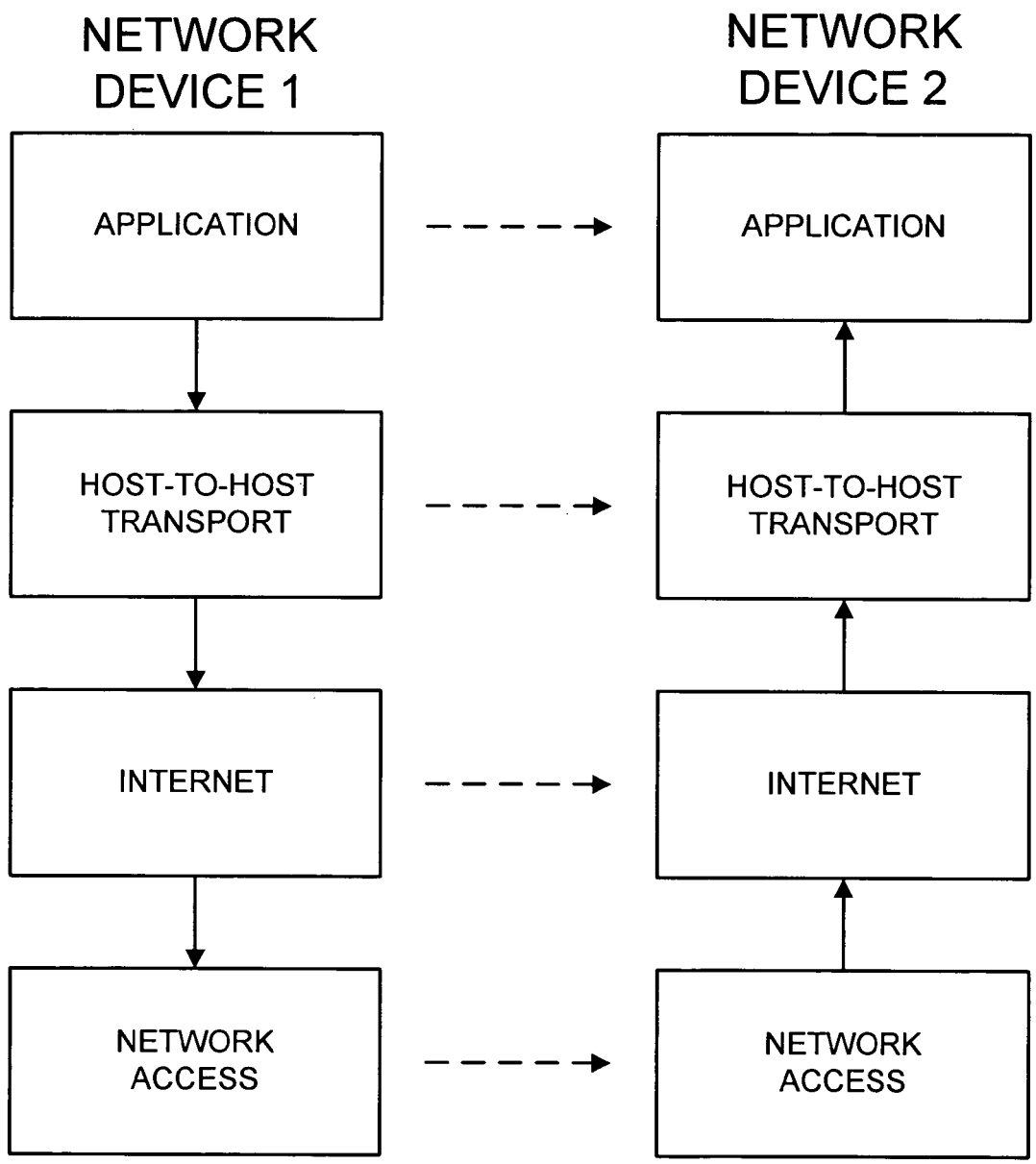
FIG. 2 illustrates physical and virtual data flow at the various layers in the DoD Reference Model during communication between two network devices, according to the prior art.
Figure 3:
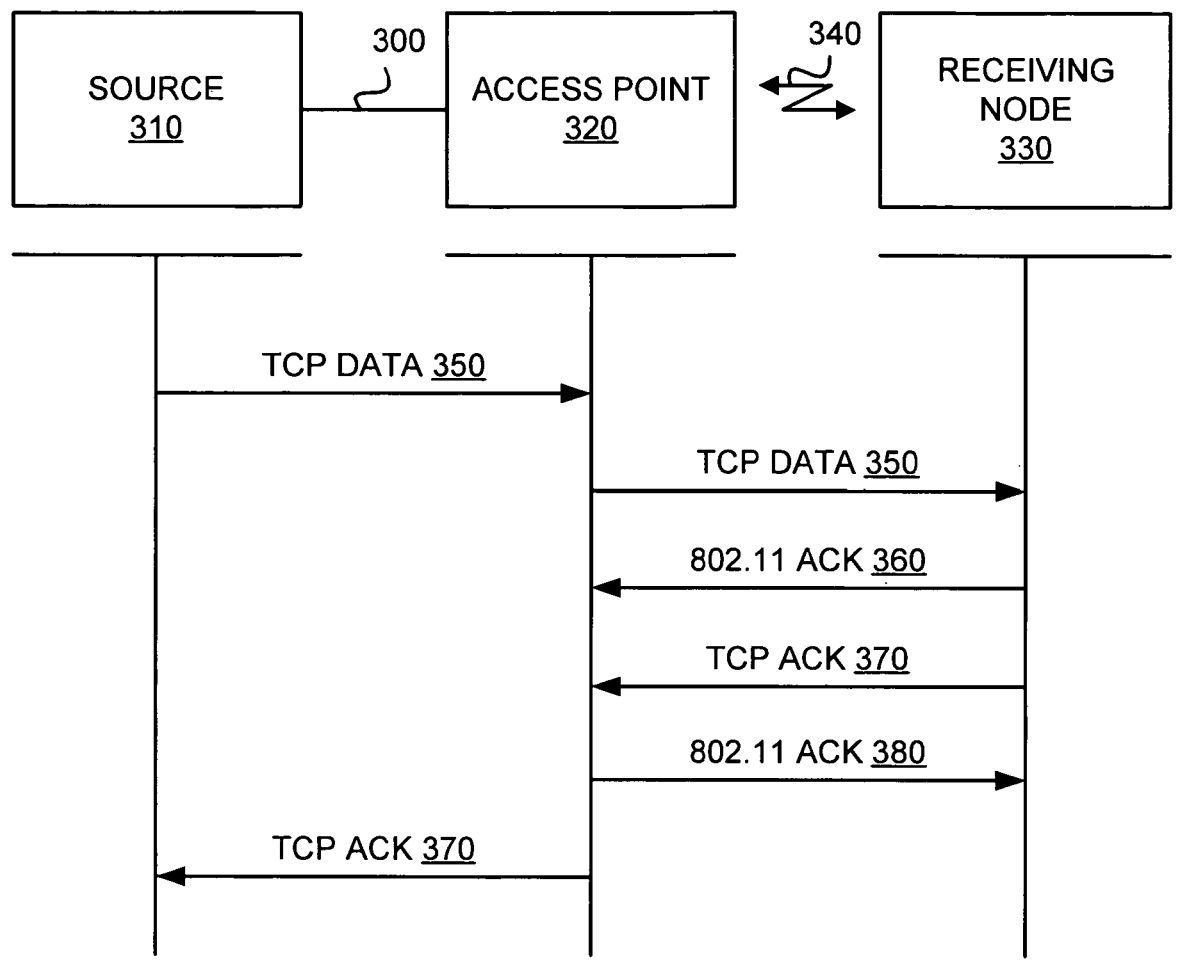
FIG. 3 illustrates transmission of TCP and 802.11 acknowledgments for TCP data transmitted from a source to a receiving node, according to the prior art.
Figure 4:
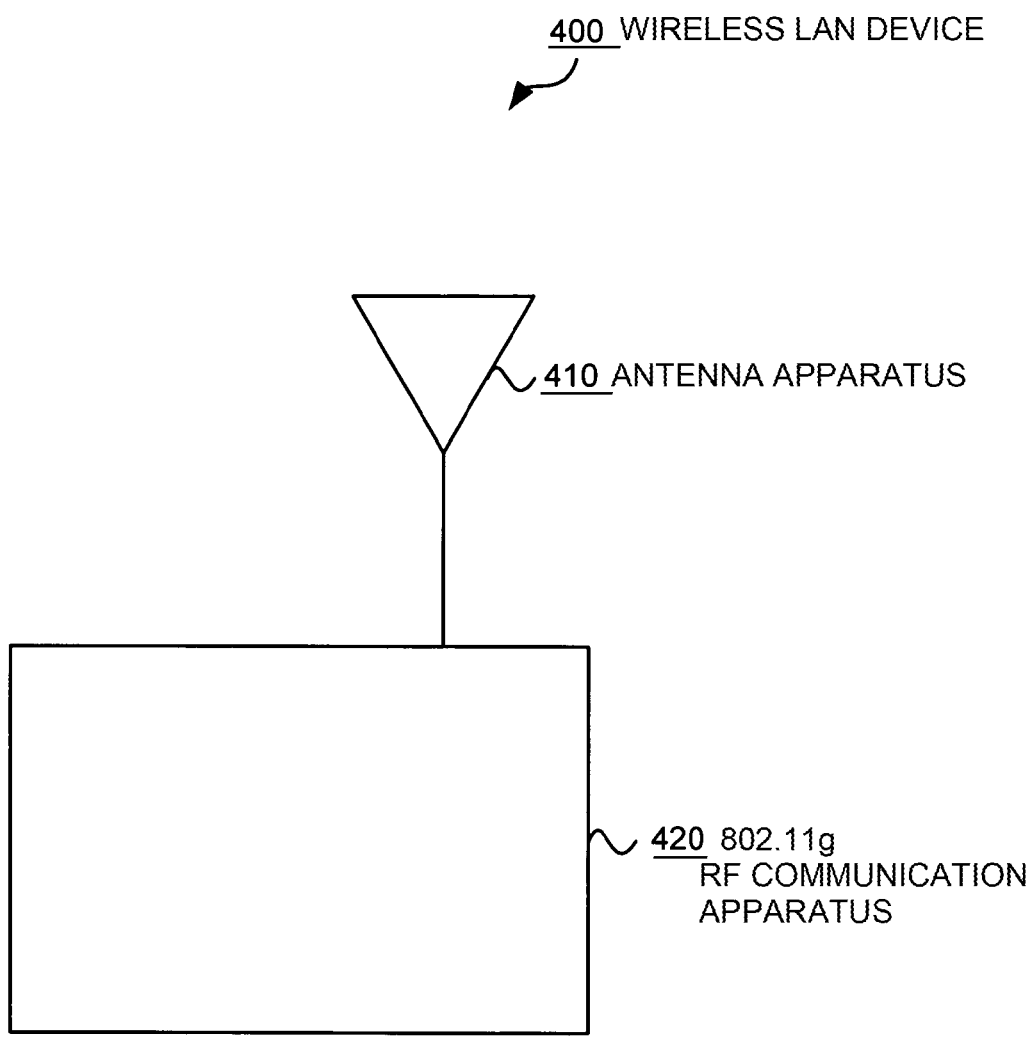
FIG. 4 illustrates an exemplary wireless local area network device, according to an embodiment of the present invention.

FIG. 4 illustrates an exemplary wireless local area network (LAN) device 400 comprising an antenna apparatus 410 and an 802.11g RF communication apparatus 420, according to one embodiment of the present invention. The wireless LAN device 400 can be, for example, a transmitter and/or a receiver, such as an 802.11 access point, a set-top box, a laptop computer, a television, a PCMCIA card, a remote control, and a remote terminal such as a handheld gaming device. In an exemplary embodiment, the wireless LAN device 400 comprises an access point for communicating to one or more remote receiving nodes over a wireless link (not shown), for instance, by way of TCP/IP in an 802.11 wireless network.

Typically, the wireless LAN device 400 receives data from a router (not shown) connected to the Internet, and the wireless LAN device 400 exchanges the data via the wireless link with one or more remote receiving nodes (not shown). The wireless LAN device 400 can also form a part of a wireless LAN by enabling communications among the one or more remote receiving nodes. Although the disclosure focuses on specific embodiments for the wireless LAN device 400, aspects of the invention are applicable to a wide variety of devices for exchanging information via a communication network, and are not intended to be limited to the specifically disclosed embodiments.

In one embodiment, the wireless LAN device 400 includes the antenna apparatus 410, the 802.11g RF communication apparatus 420 (e.g., a transceiver), and a processor (not shown) running software to control the communication apparatus 420 and/or the antenna apparatus 410. The communication apparatus 420 can be essentially any device for generating and/or receiving an RF signal. The communication apparatus 420 may include, for example, a radio modulator/demodulator for converting data received into the wireless LAN device 400 (e.g., from the router) into an RF signal for transmission to one or more of the remote receiving nodes. In some embodiments, the communication apparatus 420 comprises circuitry for receiving data packets of video from the router and circuitry for converting the data packets into 802.11 compliant RF signals. Additionally, the principles of the invention apply to an access point with a single antenna, or an access point with two omnidirectional "whip" antennas.

Figure 5:
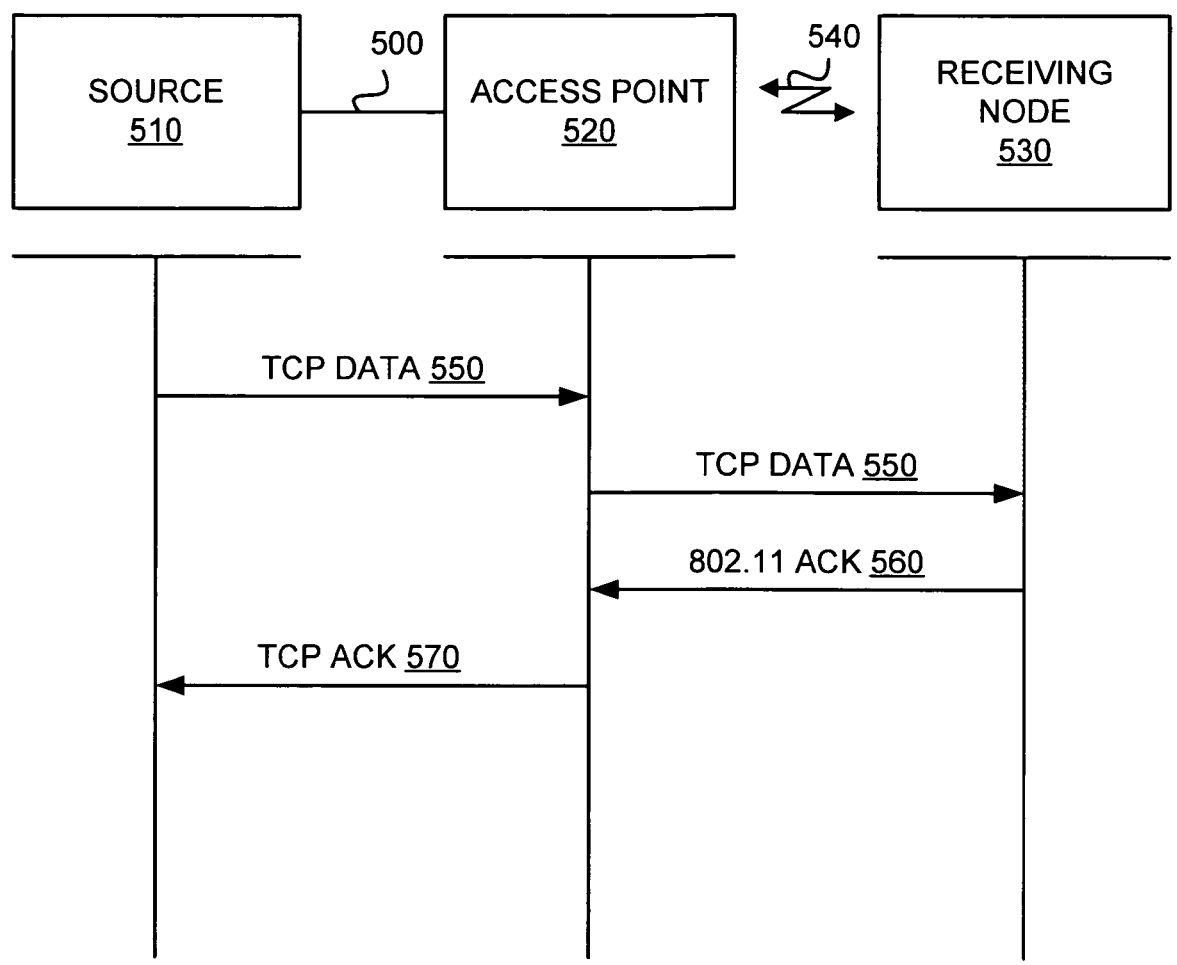
FIG. 5 illustrates transmission of TCP and 802.11 acknowledgments for TCP data transmitted from a source to a receiving node, according to an embodiment of the present invention.

FIG. 5 illustrates transmission of TCP and 802.11 acknowledgments for TCP data 550 transmitted from a source 510 to a receiving node 530, according to an embodiment of the present invention. A wired network 500 connects the source 510 to an access point 520 (e.g., such as the wireless LAN device 400 of FIG. 4). A wireless network 540 connects the access point 520 to the receiving node 530. An exchange of data between the source 510, the access point 520, and the receiving node 530 is schematically illustrated below the representation of the devices 510, 520, and 530.

The source 510 transmits the TCP data 550 destined for the receiving node 530. To reach the receiving node 530, the source 510 transmits the TCP data 550 over the wired network 500 to the access point 520. In one example, an unreliable wired network access protocol, such as, 802.3 Ethernet, may be used to transmit the TCP data 550 via the wired network 500.

After the access point 520 converts the TCP data 550 into an 802.11 frame, the access point 520 transmits the 802.11 frame comprising the TCP data 550 to the receiving node 530. Subsequently, the receiving node 530 transmits an 802.11 ACK 560 to the access point 520. Upon receiving the 802.11 ACK 560, the access point 520 has sufficient information to determine that the receiving node 530 received the TCP data 550 without error. The access point 520 then transmits a TCP ACK 570 over the wired network 500 to the source 510.

The access point 520 advantageously provides that if the access point 520 receives the 802.11 ACK 560, then the receiving node 530 received the TCP data 550 without error. Accordingly, the access point 520 and the receiving node 530 may not exchange multiple ACKs for the TCP data 540. Thus, according to one embodiment, the receiving node 530 does not send a TCP ACK to acknowledge the TCP data 550. In some embodiments, the receiving node 530 generates the TCP ACK, but is configured to suppress the TCP ACK from the transmission at the lower layer protocol. In other embodiments, the receiving node 530 is configured to not generate the TCP ACK. Not sending the TCP ACK frees the wireless link 540 for other transmissions.

Although the explanation of the embodiment shown in FIG. 5 is in terms of TCP data sent from the source 510 to the receiving node 530, similar issues exist when TCP data is sent from the receiving node 530 to the source 510 by way of the access point 520. Therefore, according to one embodiment, when TCP data is transmitted from the receiving node 530 to the access point 520 via the wireless link 540, an 802.11 ACK returned to the receiving node 530 is sufficient to inform the receiving node 530 that the TCP data was received by the access point 520.

The TCP data is then sent to the source 510 over the wired network 500. The source 510 then returns a TCP ACK to the access point 520. The TCP ACK from the source 510 is then suppressed by the access point 520. Suppressing the TCP ACK at the access point 520, advantageously, prevents the transmission of the TCP ACK to the receiving node 530 and the subsequent transmission of another 802.11 ACK back to the access point 520 from the receiving node 530 in response to the received TCP ACK.

Generally, in a TCP network, a proxy that synthesizes ("spoofs") a TCP ACK from an intended destination must take responsibility for delivering the TCP data to the intended destination. It is generally necessary for the proxy (the "spoofer") to retain the TCP data until the TCP data has been received and acknowledged by the destination. Once the source receives an acknowledgment that the TCP data has been received by the destination, the source can delete the TCP data from its transmission buffer. Thus, when the source receives a spoofed TCP ACK from the proxy before the data is actually delivered to the destination, the source can proceed as if the data had actually been delivered. Generally, the spoofed TCP ACK allows the sender to send more data to the proxy.

In this sense, the system of FIG. 5 is generally configured for using 802.11 ACKs as a proxy for TCP ACKs. Reducing the number of TCP ACKs that are sent over the wireless link 540 improves TCP data throughput across the wireless link 540. The access point 520 and receiving node 530 can be thought of as comprising a distributed proxy.

In one embodiment, the access point 520 and the receiving node 530 handshake during an initial association to enable the suppression of TCP ACKs and to enable the access point 520 to spoof the suppressed TCP ACKs to the source 510 based on 802.11 ACKs from the receiving node 530. The initial association includes an exchange of information between the access point 520 and the receiving node 530 to indicate, by way of example, that the access point 520 is capable of supporting 54 Mbps physical layer rate communications.

In another embodiment, the access point 520 broadcasts a beacon advertising its capability to generate TCP ACKs based on 802.11 ACKs. If the receiving node 530 elects to use this capability to increase the capacity for TCP data transmission over the wireless link 540, the receiving node 530 will signal this capability in an 802.11 association request sent to the access point 520. Thereafter, the receiving node 530 and the access point 520 can cooperatively suppress TCP ACKs that originate either from the transport layer in the receiving node 530 or in the source 510.

After successful completion of the 802.11 association handshake, wireless 802.11 frames comprising TCP ACKs in all TCP communications transmitted across the wireless link 540 will be suppressed by spoofing the TCP ACKs from the 802.11 ACKs as described above. A benefit of the handshaking is that the access point 520 can differentiate a receiving node (not shown) that does not support TCP ACK suppression from the receiving node 530 that does. By suppressing TCP ACKs, TCP data transmission capacity in an 802.11g network can be improved by up to 30% over that of the prior art. In some embodiments, actual data throughput is increased from 24 Mbps to 30 Mbps in the 54 Mbps 802.11g physical data rate mode.

In some embodiments, it may be advantageous to suspend TCP ACK suppression, even though the access point 520 and receiving node 530 have the suppression capability. For example, when a TCP data stream is transmitted from the receiving node 530 to the source 510 via the access point 520, the access point 520 may buffer the TCP data stream until a TCP ACK returned by the source 510 towards the receiving node 530 is received by the access point 520. In order to sustain TCP ACK suppression between the access point 520 and the receiving node 530, the access point 520 may require a very high capacity buffer to store the accumulated TCP data stream from the receiving node 530. In particular, this will be the case if the TCP data stream from the access point 520 to the source 510 is interrupted, for example, due to a network problem between the access point 520 and the source 510.

In one embodiment, to reduce the buffering required by the access point 520, the access point 520 avoids suppressing TCP ACKs even though it has the capability to do so. In other embodiments, the access point 520 suppresses TCP ACKs for only a limited number of data packets. In some embodiments, the access point 520 may reduce data transmission rates over the wireless link 540, or may stop generating 802.11 ACKs to the receiving node 530, as data buffers in the access point 520 become full.

Figure 6:
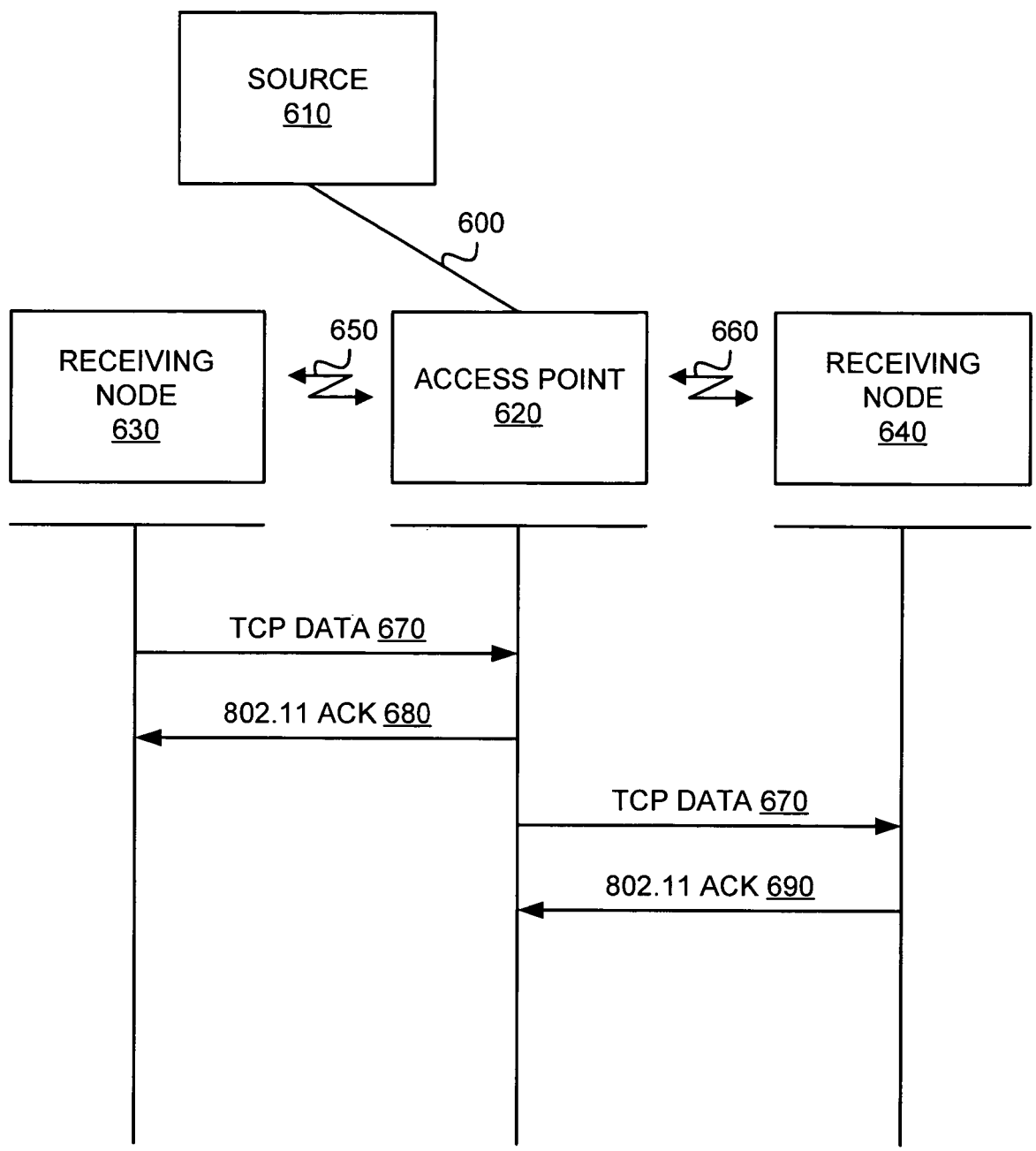
FIG. 6 illustrates transmission of TCP and 802.11 acknowledgments for TCP data transmitted between two receiving nodes of a wireless network, according to an embodiment of the present invention.

FIG. 6 shows transmission of TCP and 802.11 acknowledgments between two nodes of a wireless network according to an embodiment of the present invention. A wired network 600 connects a source 610 to an access point 620. A wireless link 650 connects the access point 620 to a receiving node 630. A wireless link 660 connects the access point 620 to a receiving node 640. An exchange of data between the receiving nodes 630 and 640 and the access point 620 is schematically illustrated below the representation of the devices 620, 630, and 640.

The access point 620 may buffer TCP data between the receiving node 630 and the receiving node 640. The access point 620 may also operate as a proxy between the receiving node 630 and the receiving node 640. When the access point 620 operates solely as a buffer, the receiving node 630 transmits TCP data 670 to the access point 620. The access point 620 then returns an 802.11 ACK 680 to the receiving node 630 to acknowledge the receipt of the TCP data 670. The access point 620 then transmits the TCP data 670 to the receiving node 640. The receiving node 640 transmits an 802.11 ACK 690 to the access point 620. In this situation, as compared to the prior art, a TCP ACK and an 802.11 ACK are eliminated both between the access point 620 and the receiving node 630, and between the receiving node 640 and the access point 620.

As described herein, the access point 620 can act to prevent an overflow of the data buffers in the access point 620. The access point 620 can suspend TCP ACK suppression entirely with the receiving nodes 630 and 655. Alternatively, the access point 620 can operate as a proxy between the receiving node 630 and the receiving node 640. In this mode of operation, the access point 620 generates a TCP ACK from the receiving node 640 to the receiving node 630 based on the 802.11 ACK 690 received from the receiving node 640. The access point 620 transmits the spoofed TCP ACK to the receiving node 630. The access point 620 may further moderate data transmission rates and TCP ACK suppression based on a degree of buffer fullness.

In general, the access point 620 may not suppress TCP segments that comprise data in addition to an acknowledgment (ACK flag set). Furthermore, in some embodiments, the access point 620 may not suppress TCP segments comprising the three-part "handshake" which initiates a TCP connection (a first TCP segment with only the synchronize (SYN) flag set, followed by a second reply TCP segment with both flags SYN and ACK set, and then a third TCP ACK confirming receipt of the SYN/ACK reply). TCP segments including certain TCP control flags, for example, the urgent pointer field (URG), the synchronize no more data (SYN FIN), and the reset connection (RST) flags are not suppressed in some embodiments. However, not all TCP implementations are the same and selected segments comprising these flags or data may be suppressed in some embodiments.

Although the present invention has been described with respect to the 802.11 wireless protocols, the principles of the invention also apply to generating an acknowledgment for a reliable higher layer protocol based on any lower layer protocol that supports reliable data transmission. Additionally, although the present invention has been described with respect to the TCP protocol, the invention also applies to any higher layer protocol that supports reliable data transmission.

For example, referring to again to FIG. 5, in one embodiment, the source 510 includes a Trivial File Transfer Protocol (TFTP) server. The TFTP protocol provides a reliable application layer protocol (i.e., the higher layer protocol) generally implemented on top of User Datagram Protocol (UDP). The receiving node 530 may request a file from the source 510 by communicating with the TFTP server. The source 510 sends the file by sending a UDP packet (in place of the TCP data 550) through the access point 520 and over the wireless link 540 to the receiving node 530. The receiving node 530, upon successful reception of the UDP packet over the wireless link 540, transmits the 802.11 ACK 560 to the access point 520.

The receiving node 530 does not send an ACK for the UDP packet because the UDP protocol does not provide reliable transmission through acknowledgments. However, the receiving node 530 may send a TFTP ACK according to the TFTP higher layer protocol. According to the principles of the invention, the receiving node 530 may suppress transmission of the TFTP ACK because the 802.11 ACK 560 was already sent. The access point 520 then may send a TFTP ACK (in place of the TCP ACK 570) to the source 510 to acknowledge reception of the file. Advantageously, the access point 520 may generate a higher layer protocol acknowledgment (e.g., the TFTP application layer ACK) based on the lower layer protocol acknowledgment (e.g., the 802.11 ACK 560).

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An access point in a wireless network comprising:
   a transmitter configured to transmit, to a destination network node in the wireless network, first data according to a lower layer protocol, wherein the first data comprises second data received from a source network node according to a higher layer protocol; and
   a receiver configured to receive a first acknowledgment, according to the lower layer protocol, transmitted from the destination network node in response to the destination network node receiving the first data,
   wherein the access point is configured to determine that the destination network node has received the first data and the second data without error based on the first acknowledgment according to the lower layer protocol received by the receiver,
   wherein the access point and the destination network node are configured to cooperate to suppress acknowledgements according to the higher layer protocol based on a response from the destination network node to a beacon transmitted by the access point advertising a capability of the access point to generate higher protocol layer acknowledgments based on lower protocol layer acknowledgments, and
   wherein the access point is configured to generate and transmit a second acknowledgment, according to the higher layer protocol, to the source network node, as an acknowledgment for the second data.

2. The access point of claim 1, wherein the receiver is configured to receive additional data, according to the higher layer protocol, from the source network node, in response to the second acknowledgement.

3. The access point of claim 1, wherein the access point is configured to receive the first data from the source network node via a wireless connection using the receiver.

4. The access point of claim 1, wherein the access point is configured to receive the first data from the source network node via a wired connection using the receiver.

5. The access point of claim 1, further comprising an antenna apparatus and a RF communication apparatus.

6. The access point of claim 5, wherein the RF communication apparatus is configured to operate utilizing the 802.11g protocol.

7. The access point of claim 1, wherein the beacon transmitted by the access point advertises a capability of the access point to generate transmission control protocol (TCP) acknowledgments based on 802.11 acknowledgments.

8. A wireless network device comprising:
   a receiver configured to receive, from a network node and via a wireless link, first data according to a lower layer protocol, wherein the first data comprises second data according to a higher layer protocol;
   a transmitter configured to transmit, via the wireless link and to the network node, a first acknowledgement, according to the lower layer protocol in response to the receiver receiving the first data; and
   a processor configured to: receive a beacon transmitted by the network node advertising a capability of the network node to generate higher protocol layer acknowledgments based on lower protocol layer acknowledgments on behalf of the wireless network device; respond to the beacon; and cooperate with the network node to suppress transmission to the network node of a second acknowledgment, according to the higher layer protocol, of the second data based on the beacon and the response of the wireless network device to the beacon.

9. The wireless network device of claim 8, wherein the processor is configured to prevent generation of the second acknowledgement according to the higher layer protocol.

10. The wireless network device of claim 8, wherein the network node is an access point.

11. The wireless network device of claim 8, wherein the second data includes transmission control protocol (TCP) data.

12. The wireless network device of claim 8, wherein the lower layer protocol includes an 802.11 protocol.

13. A method for reliably transmitting data from a source node to a destination node in a wireless network, the method comprising:
   receiving, at an intermediate device between the source node and the destination node, second data from the source node received according to a higher layer protocol;
   encapsulating, by the intermediate device and according to a lower layer protocol, the second data within first data and transmitting the first data to the destination node;

receiving, by the intermediate device and from the destination node, a first acknowledgment according to the lower layer protocol indicating that the first data has been received by the destination node;

determining, by the intermediate device and based on the first acknowledgement, that the destination node has received the first and second data without error;

suppressing, by the intermediate device and in cooperation with the destination node, higher layer protocol acknowledgements, wherein the intermediate device and the destination node cooperate to suppress higher layer protocol acknowledgements based on a response from the destination node to a beacon transmitted by the intermediate device advertising a capability of the intermediate device to generate higher protocol layer acknowledgments based on lower protocol layer acknowledgments; and generating and transmitting, by the intermediate device, to the source node, and according to the higher layer protocol, a second acknowledgment as an acknowledgment for the second data.

14. The method of claim 13, wherein the second data includes transmission control protocol (TCP) data.

15. The method of claim 13, wherein the lower layer protocol includes an 802.11 protocol.

16. The method of claim 13, wherein the intermediate device and the destination node cooperate to suppress higher layer protocol acknowledgements based on a response from the destination node to a beacon transmitted by the intermediate device advertising a capability of the intermediate device to generate higher protocol layer acknowledgments based on lower protocol layer acknowledgments.

17. The method of claim 13, wherein the intermediate device is an access point.

18. The method of claim 13, wherein the higher and lower layer protocols are both reliable transmission protocols.

19. The method of claim 13, wherein the intermediate device and the destination node cooperate to suppress higher layer protocol acknowledgements during a handshake process between the intermediate device and the destination node.

20. The method of claim 13, wherein the first data comprises 802.11 frame data.

* * * * *